ELECTRIC PULSE GENERATOR

Filed Sept. 23, 1959

INVENTOR
FRANCO FILIPPAZZI
BY
Kenyon & Kenyon
ATTORNEYS

3,118,072
ELECTRIC PULSE GENERATOR

Franco Filippazzi, Milan, Italy, assignor to Ing. C. Olivetti & C., S.p.A., Ivrea, Italy, a corporation of Italy Filed Sept. 23, 1959, Ser. No. 841,762
Claims priority, application Italy Sept. 30, 1958
4 Claims. (Cl. 307—88.5)

The present invention relates to electrical pulse generators.

In some information handling equipments using digital techniques it is often required to induce square shaped current pulses in a substantially inductive load.

Said problem arises in magnetic core matrix storages, wherein binary informations may be read from or written into the cores by selectively applying, from a common pulse generator, suitable electrical pulses to a set of selecting wires inductively coupled to the cores.

The same problem arises when writing binary informations into the elemental areas or cells of the surface of a magnetic drum or a magnetic tape storage by supplying electrical pulses to the magnetic recording heads associated with said surface. Then a very fast switching of the current through the magnetic recording heads is required, whereby a suitable pulse generator is required.

Accordingly, it is an object of the invention to provide a suitable pulse generator for such magnetic storages.

A further object of the present invention is to provide a generator adapted to induce pulses of either polarity in a substantially inductive load.

According to a feature of the invention, I provide in an electric pulse generator including a transformer having a secondary winding connected to a substantially inductive load to be fed and a primary winding, a constant voltage source having three terminals, current switching means, a resistance, said primary winding being connected to a pair of said terminals in series with said current switching means and said resistance, said current switching means being operable to cause current pulses to flow across said primary winding, and unidirectional conducting means for connecting a terminal of said resistance to the third terminal of said source, said third terminal having such a potential as to limit the voltage applied across said current switching means when being cut off.

Figure 1:
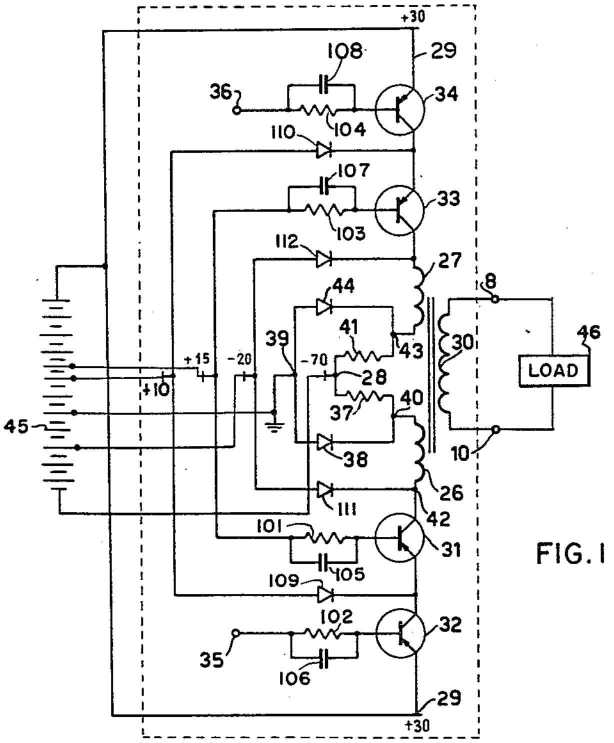
Figure 2:
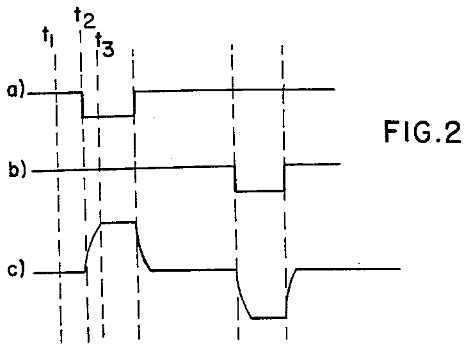

The novel features of the present invention will become apparent from the following description of a preferred embodiment thereof taken in conjunction with the accompanying drawings in which FIG. 1 shows a circuit diagram of the pulse generator according to the invention; and, FIG. 2 shows a time diagram of some signals appearing in the circuit of FIG. 1.

The pulse generator includes a transformer and is made of two symmetrical sections adapted to generate pulses of opposite polarities.

More particularly, a first section comprises a first primary winding 26 of said transformer connected to a first terminal 29 and a second terminal 28 of three terminals 28, 29 and 39 of a constant voltage source 45 in series with a first current switch including transistors 31 and 32, and with a first resistance 37; likewise, a second section comprises a second primary winding 27 of said transformer connected to said terminals 29 and 28 in series with a second current switch including transistors 33 and 34, and with a second resistance 41.

A common secondary winding 30 of said transformer has its terminals 8 and 10 connected to a substantially inductive load 46 to be fed, and is inductively coupled to both said primary windings 26 and 27. Either the first or the second current switch may be operated so as to be driven to the on condition for a short time, by applying to its terminal 35 or 36 respectively a short pulse upon operating either the first or the second switch a conductive path is established between the terminals 28 and 29 through the first or second primary winding respectively, whereby a current pulse is caused to flow across said first or second primary winding respectively and thus through the secondary winding and through the load as well.

The windings are so arranged that the secondary winding 30 is supplied with pulses of either polarity depending upon whether a current pulse flows across the first primary winding or the second primary winding.

Both the first and the second switches include a pair of cascade connected transistors 31, 32, and 33, 34, respectively. As will be described hereinafter, a terminal 40 of the resistance 37 is connected through unidirectional conducting means, such as a clamping diode 38, to the third terminal 39 of the voltage source having such a potential as to limit the voltage applied to the switch comprising the transistors 31 and 32 when said switch is cut off. Likewise, a terminal 43 of the resistance 41 is connected through a diode 44 to said terminal 39.

Suitable resistances 101, 102, 103 and 104 are connected to the base circuit of the transistors 31, 32, 33 and 34, respectively, to limit the base current thereof.

A condenser 105, 106, 107 and 108, respectively, is connected in parallel to each one of said resistances for speeding up the base current variations, so as to increase the switching speed of the transistors.

Diodes 109 and 110 connected between a +10 volts source and the collectors of the transistors 32 and 34, respectively, are used to limit the voltage overshoots applied to said collectors.

Likewise, diodes 111 and 112 connected between a —20 volts source and the collectors of the transistors 31 and 33, respectively, are used to limit the voltage overshoots applied to said collectors.

The bases of the transistors 31 and 33 are biased by means of a +15 volts source connected thereto through the resistances 101 and 103, respectively.

The mode of operation of one section of the generator will now be considered, that of the other section being exactly the same.

Under quiescent conditions (time $t_1$ in FIG. 2) the terminal 35 is held at a potential slightly higher than the potential of the emitter of the transistor 32, whereby said transistor is cut off. Therefore, the transistor 31 is cut off as well.

Under these conditions, current flows from the terminal 39 via the diode 38 and the resistance 37 to the terminal 28, whereby the terminal 40 of the primary winding 26 is held at the potential of the terminal 39, namely at the ground potential, due to the inappreciable forward resistance of the conducting diode 38. Furthermore, since the switching transistors 31 and 32 are cut off, said primary winding is equipotential.

It is to be noted that under said quiescent conditions the diode 38, by clamping the terminal 40 to the ground potential, acts to limit the voltage applied to the switching transistors, thus avoiding said transistors to be damaged.

Assume now that a negative electric signal as shown in FIG. 2*a* is supplied to the terminal 35 (time $t_2$ of FIG. 2) to force down the base potential of the transistor 32 under the emitter potential. Then the transistor 32 is driven into a conducting state, thus causing also the transistor 31 to conduct, whereby the switch including transistors 31 and 32 is driven on.

Therefore, the terminal 42 of the primary winding 26 will be connected to the terminal 29 through the very low resistance of the switch including transistors 31 and 32 which is in the on condition, and will nearly assume the potential of said terminal, while the diode 38 continues to conduct, thus causing the terminal 40 to be held at the potential of the terminal 39.

Thus a voltage being suddenly applied between the two terminals of the primary winding 26, a current transient is generated through said primary winding.

During a first part of the transient period, as the diode 38 continues to conduct, the terminal 40 of the primary winding 26 is held at the potential of the terminal 39, whereby the value of the current flowing through the resistance 37 is the same as under the quiescent conditions hereinabove considered.

Simultaneously, a current rises up exponentially through the primary winding 26, which begins to share the constant current flowing through the resistance 37 with the diode 38, whereby the current across the primary winding 26 increases as the current of the diode 38 decreases.

As the current across the primary winding 26 reaches the value of the entire current of the resistance 37, the current of the diode 38 is extinguished, whereby the diode is cut off, thus allowing the potential of the terminal 40 to rise over the potential of the terminal 39, and therefore allowing the current of the resistor 37 to increase.

Now a second part of the transient period begins. The current of the resistance 37, which is now equal to the current across the primary winding 26, begins to increase up to the maximum value determined by the voltage applied between the terminals 28 and 29 and by the resistance itself. As said maximum value is reached, the primary winding 26 becomes equipotential, both the terminals 40 and 42 being at the potential of the terminal 29. Then (time $t_3$) the rise of the current pulse through the load ceases.

Therefore, it is clear that during the first part of the transient period the current of the primary winding 26 increases according to an exponential line with a great time constant but towards a very high value, as the total resistance then effectively connected in series to the primary winding 26 is very small. During said first part the current increase is closely linear. The initial rise rate of said current is determined by the load inductance as seen by the primary winding 26 and by the initial voltage applied to the primary winding.

However, said voltage is limited by the maximum voltage which may be applied to the switching transistors when cut off. It will thus be apparent that advantages may be obtained by using a pair of cascade connected transistors to form the current switch, instead of using a single transistor, as said maximum voltage will then be increased.

During the second part of the transient period the current of the primary winding increases according to an exponential line towards the maximum current value as determined above, namely, towards a value much smaller than during the first part, but with a much smaller time constant. However, the increase rate of the current is lower during the second part than during the first part.

The point at which said second part begins may be varied by varying the potential of the terminal 28, while varying the value of the resistance 37 to obtain the maximum current value as stated above.

Optimum values of said potential and of said resistance may be determined, beyond which an inappreciable increase of the current rise rate together with an appreciable increase of the power dissipation through the resistance 37 is obtained.

It will thus be apparent that by connecting through a diode the terminal 40 of the primary winding 26 to the terminal 39 having a fixed potential it is possible to determine the potential 28 and consequently the value of the resistance 37, irrespective of the maximum voltage which may be applied to the switching transistors when cut off, whereby the current generator may have a high internal resistance because said internal resistance is substantially determined by the resistance 37. Thus the generator is rendered less sensitive to the load variations.

It is thus apparent that by feeding a negative pulse to the terminal 35 as shown in FIG. 2*a*, a corresponding current pulse is obtained through the secondary winding 30, as shown in FIG. 2*c*. On the other hand, if at a different time a negative pulse is fed to the terminal 36 as shown in FIG. 2*b*, a second current pulse having the opposite polarity is obtained through the secondary winding 30, as shown in FIG. 2*c*. In this case the upper section of the pulse generator operates as the first section in the case previously described.

By using the described generator, pulses having very low rise time may thus be obtained through the magnetic core selecting windings or through the magnetic head energizing windings connected to the secondary winding 30 and forming the load.

What I claim is:

1. In an electric pulse generator including a transformer having a secondary winding connected to a substantially inductive load to be fed and a primary winding, a constant voltage source having first, second and third terminals, transistor current switching means having a maximum operating voltage lower than the voltage between the first and the second terminals of said source, a resistance, a first terminal of said primary winding being connected to the first terminal of said source through said transistor current switching means, a second terminal of said primary winding being connected to the second terminal of said source through said resistance, said transistor current switching means being operable to cause current pulses to flow through said primary winding, and unidirectional conducting means for connecting the second terminal of said primary winding to the third terminal of said source, said third terminal of said source having such a potential as to limit the voltage applied through said primary winding to said transistor current switching means below said maximum voltage when said transistor current switching means are not operated.

2. An electric pulse generator as defined in claim 1, characterized in that said transistors current switching means include a pair of cascade connected transistors.

3. In an electric pulse generator including a transformer comprising a first and a second primary winding, and a common secondary winding connected to a substantially inductive load to be fed, a constant voltage source having three terminals, a first current switch, a first resistance, said first primary winding being connected to a pair of said terminals in series with said first current switch and said first resistance, a second current switch, a second resistance, said second primary winding being connected to said pair of terminals in series with said second current switch and said second resistance, said first current switch being operable to cause current pulses to flow across said first primary winding, said second current switch being operable to cause current pulses to flow across said second primary winding, a first unidirectional conducting element connecting a terminal of said first resistance to the third terminal of said source, a second unidirectional conducting element connecting a terminal of said second resistance to said third terminal, said third terminal having such a potential as to limit the voltage applied across said first and second current switch when cut off, said secondary winding being supplied with pulses of either polarity depending upon whether a current pulse flow either across said first primary winding or said second primary winding.

4. An electric pulse generator as defined in claim 3, characterized in that said current switches each one include a pair of cascade connected transistors.

References Cited in the file of this patent

UNITED STATES PATENTS

| | | |
|---|---|---|
| 2,822,470 | Imm | Feb. 4, 1958 |
| 2,914,683 | Terry | Nov. 24, 1959 |

FOREIGN PATENTS

| | | |
|---|---|---|
| 1,174,488 | France | Mar. 11, 1959 |